Dec. 18, 1928.  
R. C. LEAKE  
1,696,169  
TRAIN CONTROL RELAY  
Filed Nov. 3, 1921  
3 Sheets-Sheet 2
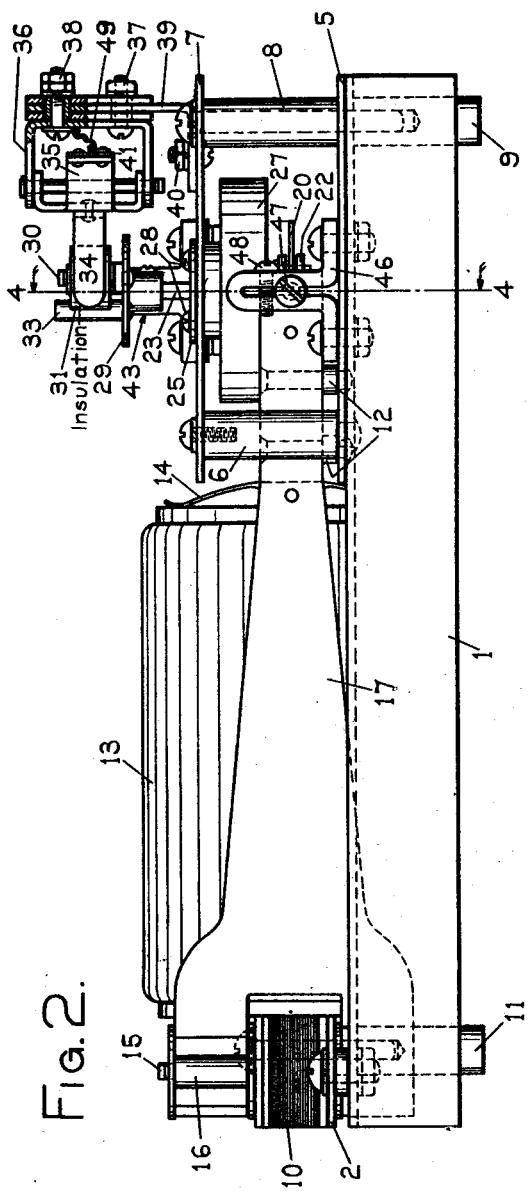

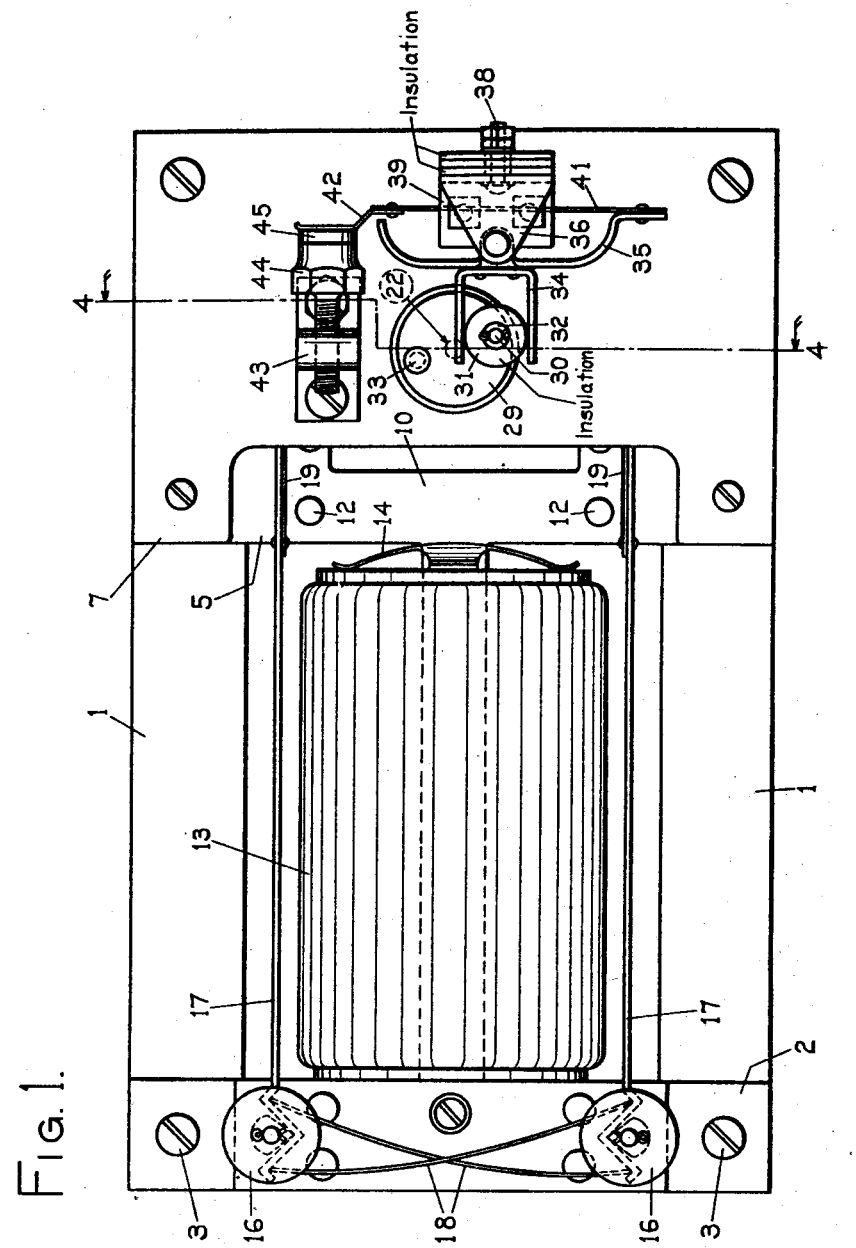

Dec. 18, 1928.
R. C. LEAKE
1,696,169
TRAIN CONTROL RELAY
Filed Nov. 3, 1921
3 Sheets-Sheet 3
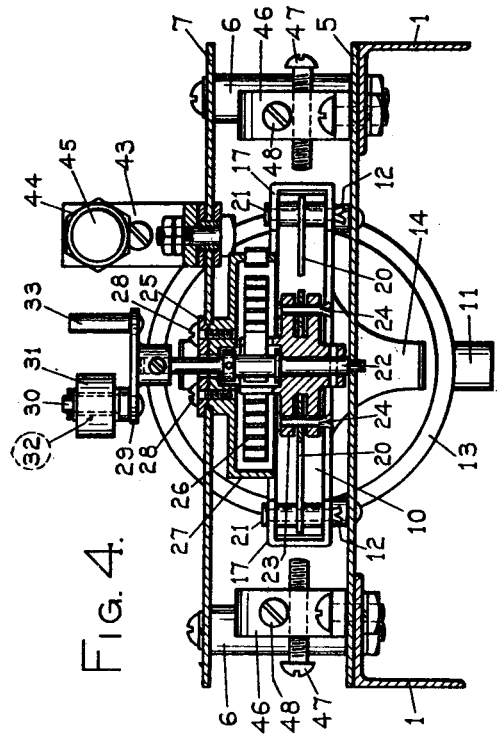
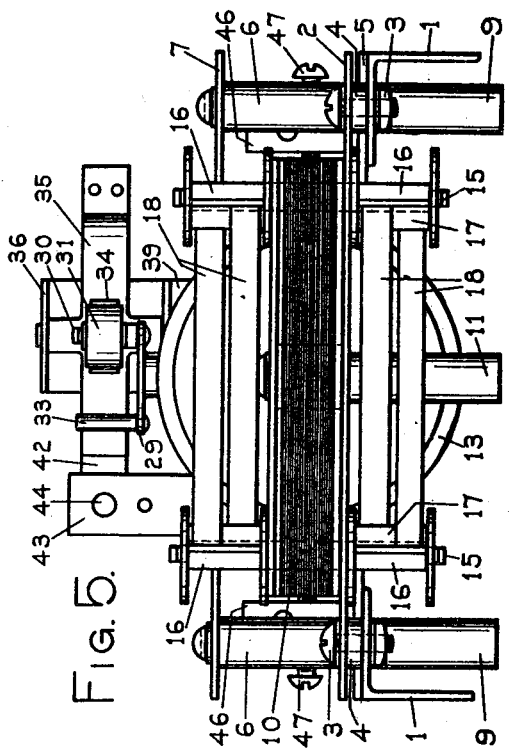
Richard C. Leake, Inventor
By his Attorney
Neil W. Preston Patented Dec. 18, 1928.

1,696,169

UNITED STATES PATENT OFFICE.

RICHARD C. LEAKE, OF ROCHESTER, NEW YORK, ASSIGNOR TO GENERAL RAILWAY SIGNAL COMPANY, OF GATES, NEW YORK, A CORPORATION OF NEW YORK.

TRAIN-CONTROL RELAY.

Application filed November 3, 1921. Serial No. 512,559.

This invention relates to electrically operated relays, and more particularly to relays for use in automatic train control systems for railroads, and adapted to be carried on a locomotive or other railway vehicle.

The car relays used in cab signals or train control systems for railroads, being carried on a locomotive or similar vehicle, are subjected to irregular and peculiar shocks, jars and vibrations of magnitude and intensity not found in any other service. In certain types of train control systems, especially in the intermittent inductive type in which the controlling impulses or influences are communicated from the trackway to the moving vehicle through an intervening air gap by suitable track elements located at intervals along the track, it is desirable to employ a car relay capable of working reliably on small current changes of relatively short duration, a relay of the tractive armature type being considered very efficient and desirable for such systems.

In order to obtain such a sensitive and quick acting relay, it is considered preferable to employ light moving parts having little inertia and operable on a small amount of energy; but it is found that when a relay is thus constructed so as to operate properly and efficiently under these conditions, the severe jar and vibration to which the relay is subjected tends to cause a false operation. A single false operation is, of course, prohibitive in a train control system, which must by its very nature be dependable in its performance; and since the car equipment is ordinarily organized, by the use of a stick feature in connection with the relay or device controlled thereby, a single momentary opening of the relay contacts will result in a brake application, or the imposition of some other form of automatic control, so that only one momentary operation of the relay contacts by jar and vibration produces a false control that renders the whole system seriously defective. A relay of the tractive armature type is preferably employed in a normally closed circuit system, which is considered good practice in railway signaling and control systems; for the reason that a failure of the circuit will be on the side of safety, in that, such failure will operate the mechanism controlled by such relay the same way as a danger condition, thereby making a brake application or impose some other form of automatic control. In circuits of this kind, as well as in many others, it is expedient to employ a relay having an operating characteristic by virtue of which the "dropaway current," that is, the current that will just drop the armature, is very high as compared with the "pickup current", that is, the current which will just pick up the armature.

With these and other considerations in mind, the primary purpose of the present invention is to construct a simple, efficient, and reliable relay which will be relatively quick acting and sensitive, and at the same time will not be improperly or falsely operated by the irregular shocks and vibrations encountered on locomotives. Generally stated, it is proposed in this invention to make the moving parts of the relay as light as consistent with efficient and reliable performance; to balance the armature and other moving parts substantially against rectilinear and curvilinear vibration, that is, provide each reciprocating part with an oppositely moving reciprocating part coupled thereto, thereby balancing them against each other; and provide each rotating element with a counterbalancing rotatable element coupled thereto to rotate in the opposite direction, thereby balancing these rotatable elements against each other; to provide compensating means in the structure of the relay whereby the attractive force of the armature will be practically balanced against the action of a spring throughout the entire movement of the armature, by virtue of which the "dropaway current" will be almost equal to the "pickup current"; to form an efficient magnetic circuit; and in general adapt and organize the parts of a tractive type relay for efficient and reliable operation under severe shocks, jars and vibrations.

Other features and advantages of the invention will appear hereinafter as the description progresses.

In describing the invention in detail, reference will be made to the accompanying drawings, in which:—

Fig. 1 is a plan view of the device embodying this invention;

Fig. 2 is a side view of the device partly shown in section for clearness;

Fig. 3 is a top view of one end of the device with the top plate removed, certain parts being cut away for clearness;

Fig. 4 is a section taken on line 4—4, Fig. 1, viewed in the direction of the arrows; and Fig. 5 is an end view of the device showing the left hand end of the device, as shown in Fig. 1.

The particular construction illustrated, embodying the present invention comprises a frame consisting of two angle bars 1 fastened together by a crossbar 2 at one end, which is fastened thereto but spaced therefrom by two bolts 3 with spring washers and spacing members 4; and at the other end the bars are held together by a plate 5 riveted thereto by rivets forming upstanding posts 6 on which is supported a top plate 7. Two spacing sleeves 8 are provided between the two plates through which screws pass into legs 9 forming a support for one end of the frame. A core 10 made up of laminated soft iron of H-shape is supported on the crossbar 2 and plate 5 by any suitable means, a bolt having a cylindrical nut forming a third leg 11 and rivets 12 being shown in this instance (see Figs. 4 and 5). The middle bar of the H-shaped core is provided with a coil 13, which is held in position by a four-prong spring plate 14. Pins 15 pass through the crossbar and core having their opposite ends provided with spools 16, a portion of each spool being cut away to provide knife edge bearings. These spools are held in place by cotter pins passing through each end of the pins. Two oppositely disposed armatures 17 having one end bifurcated and each bifurcation bent in the shape of a W, rest against the knife edges. Two pairs of steel springs 18 (see Figs. 1 and 5) are positioned diagonally between the W-shaped portion of the armatures forming crosses. By looking at Fig. 1 of the drawing it will be noted that by moving the armatures in opposite directions, the compression of the springs will not be changed materially. By making the spring sufficiently heavy the movement of one armature will move the other in the opposite direction. These springs are provided to hold the armatures against their knife edge bearings permitting movement of the armatures in opposite directions simultaneously and have very little, if any, tendency to bias the armatures in one direction or the other. The opposite ends of the armatures have a non-magnetic plate 19 riveted thereto which prevent the armatures from making physical contact with the core. The object for providing this plate is to improve the performance characteristic of the relay, as pointed out hereinafter.

The free ends of the armature 17 are pivotally connected to curved links 20 by split pins 21, the other end of the links being fastened to a cross arm 22 carried by a spindle 23 and are fastened thereto by similar pins 24. The spindle 23 is pivoted in the bottom plate 5 and extends through a bearing 25 fastened to the top plate 7. This construction obliges the armatures 17 to move oppositely simultaneously and therefore the armatures themselves will be balanced against each other for, both, rectilinear and curvilinear vibration and disturbances. The spindle 23 and the mechanism carried thereby, is however only balanced in itself against rectilinear disturbances and must be counterbalanced as will appear hereinafter. The spindle 23 is biased in a direction to hold the armatures 17 away from the pole pieces of the core 10 by a spiral spring 26, having its outside end fastened in a casing 27, this casing being fastened to the bearing plate 25 by screws 28. The top end of the spindle 23 carries a flanged socket 29, which is adjustably secured thereto by a set screw. A stud 30 having a roller 31 of insulating material journaled thereto by means of a metallic sleeve 32, is riveted to the flanged socket 29, and diametrically opposite to this roller 31 is a counterweight 33 riveted to the flanged socket 29 to counterbalance the roller 31 and the supporting means therefor.

The roller 31 engages between the arms of a U-shaped member 34 riveted to a switch supporting member 35, which is pivotally supported in a stationary bracket 36. This bracket 36 is bolted to pedestal 39 by a bolt 37 and binding post 38 but insulated from a pedestal 39, which is fastened on the plate 7 by suitable fastening means, bolts 40 being used in this instance. The switch supporting member 35 is provided with a long contact spring 41 slightly tensioned to rest against the curved end of the member 35 when the relay is deenergized, and carries a non-corrosive contact 45. In order to conduct current from the binding post 38 to the movable contact spring 41, a very flexible conducting wire or pigtail 49, has been connected between the post and contact spring. A contact post 43, also serving as a binding post, is fastened to the top plate 7 by bolts and insulating sleeves and washers in the usual manner. This contact post 43 is drilled and tapped crosswise and has a conducting cap screw 44 provided at its end with a non-corrosive contact 45, screwed therein, so that the position of the contact may be varied by turning the cap screw.

Each of the armatures is provided with an adjustable stop to limit the distance the spring may move it away from the pole pieces. These stops consist of a strip of metal 46 bent back on itself and bolted onto the bottom plate 5. The slot formed by so bending the strip is drilled and tapped and contains a stop screw 47 turned into the slot a suitable distance, against the end of which its corresponding armature may abut. To lock the stop screw 47 in position, a hole is drilled in the strip of metal crosswise and adjacent the stop screw, into which a lock screw 48 is screwed to bind the strip and thereby hold the stop screw 47 in locked position.

Electro-magnets of the tractive iron armature type have a performance characteristic, which under certain conditions is undesirable, especially when used in a relay which is to be used in an energized circuit and is to open when the current has dropped slightly in value, unless some modifying or compensating means is provided. In an electro-magnet of this kind the tractive force varies as the square of the flux through the armature, and the flux varies approximately inversely as the square of the distance of the air gap during the movement of the armature, this relation being true if the reluctance of the iron is negligible as compared with reluctance of the air gap, and therefore is approximately true where the air gap is appreciable. In the particular relay embodying the present invention, such modifying means has been provided by having the effective lever arm of its mechanical transmitting system vary approximately in accordance with the variation of the tractive force of the armatures, due to the change in the air gap.

In the particular construction illustrated, the non-magnetic or residual stop plate 19 has been riveted to the armatures so that the air gap can not become zero. This is desirable for if the armatures could physically contact the core of the relay, the residual magnetism would tend to hold the armatures in contact with the core, and a very large reduction in current would be necessary to drop the armatures away from the core. A further reason for providing the non-magnetic residual stop plates 19 is to use a movement of the armatures between their extreme positions where the rate of change of tractive force of the armatures is low, since it would be difficult to provide a practical mechanical mechanism to compensate for such variation of force for small air gaps, the variation of this force theoretically approaching infinity as the air gap approaches zero. Desiring, however, to have the tractive force of the armature approximately counterbalanced by the force of the spring at different points of movement of the armatures 17, a special scheme of connecting the armature to the spring is made use of in this invention in the following manner.

The curved links 20 are connected to the crossbar 22 to change the practically constant force of the spring 26 into a force at the point of pivotal connection of the curved links 20 to the armatures 17, which rapidly increases as the armatures approach the core 10. By looking at Fig. 3 and referring to the angle between the line of action of the free ends of the armatures and the crossbar as the angle A, it will be observed that the effective lever arm of the compensating mechanism upon which the spring acts varies as the sine of the angle A. In order to compensate for variation of tractive force of the armatures for very small air gaps, such as would be encountered if no non-magnetic stop plate were used, it would be necessary to make the angle A very small, thus bringing the crank comprising the crossbar and the curved link pivoted thereto almost on center. This is undesirable on account of the instability of the device that would result, because any small amount of variation due to worn pivotal connections, and the like, would change the operating characteristic appreciably.

Although it is desirable to compensate for the rate of change of tractive force of the armatures, and in this way increase the "dropaway current" as compared with the "pickup current," it is not necessarily desirable to entirely compensate for this rate of change, because by so doing, no force would be left to provide contact pressure. For ordinary working conditions, therefore, it is preferred to compensation for the rate of change of tractive force to an extent to just leave sufficient force to make the necessary contact pressure. To determine in practice the relation of the angle A to the air gap to obtain this compensation, it is expedient to plot a curve, with the air gap as abscissas and the sum of the forces of the two armatures as ordinates. This may easily be done by removing the spring 26 and measuring the force at the point of pivotal connection of the curved links 20 to one of the armatures 17. The spring may then be put back in place and tensioned approximately to the desired amount, and the force on one of the armatures 17 due to the spring 26 through the curved links may then be measured at the same point for different air gaps with the relay deenergized, and by plotting this curve on the same sheet the relation of the tractive force of the armature, to force of the spring transformed by the compensating mechanism may be observed. By varying the angle A with respect to the air gap and by varying the tension of the spring, a relation may be found where the sine of the angle will vary to compensate for the rate of the tractive force of the armatures to the extent desired. From these curves the size and relation of the several parts may be determined, and also the thickness of the non-magnetic residual plates may be chosen so as to obtain the desired operating characteristics and contact pressure.

By referring to Fig. 3, it is obvious that the opposed armatures are coupled to a spindle in a manner to move in opposite directions at all times so that any vibration affecting one will affect the other; and since they are oppositely coupled, the inertia of one will counterbalance the inertia of the other, thereby making the armatures immune to vibration of any kind. The coupling means between the armatures, however being partly rotatable is balanced only against rectilinear disturbances, and provision is necessary to counterbalance this rotating means by another rotating element coupled thereto to rotate in the opposite direction, so that the device may also be balanced against curvilinear jars and vibration. The spindle 23 and devices carried thereby are coupled to the switch supporting member 35 by the roller 31 engaging between the U-shaped member 34 of the switch supporting member in a manner to constitute a mechanical connection for rotating the switch supporting member 35 in the opposite direction to that of the spindle 23, and torque through lever arms of variable length, thus causing a variable angular velocity ratio between these rotatable members, the variation of the angular velocity ratio being chosen so that the effect of the pressure due to the contact spring may be compensated for, to a certain extent, by this variable connection between these two devices. It is apparent that the inertia of this spindle 23 and the mechanism carried thereby can not be counterbalanced by the inertia of the rotatable switch supporting member 35 at all points through the arc of movement, and therefore these rotatable devices will in each instance be so constructed and adjusted that they will be counterbalanced for both rectilinear and curvilinear disturbances when the relay is in its normal position. In the particular device illustrated, these rotatable members have such moments of inertia, respectively, and are coupled together to constitute an angular velocity ratio so that they will be counterbalanced when the relay is in its energized position.

Having shown and described one specific form of my invention, I desire to have it understood that various changes in form, arrangements and details of construction may be made, without departing from the spirit and scope of my invention.

What I claim is:—

1. A relay comprising a core, armatures balanced against each other and mechanically connected to move together, and mechanisms including pivotally mounted elements driven by said armatures and also balanced against each other; whereby the operation of the relay is unaffected by rectilinear or curvilinear vibratory disturbances.

2. A relay comprising a core, two movable mechanisms including armatures actuated by the magnetization of said core and a pivotally mounted element mechanically connected to said armatures, said mechanisms being balanced against each other and not affected by rectilinear or curvilinear vibratory disturbances.

3. A sensitive relay for automatic train control systems comprising, a core, a winding on said core, oppositely disposed knife edge bearings associated with said core, a pair of armatures each having a groove adapted to cooperate with a knife edge bearing, means for operatively connecting said armatures and for holding them in cooperation with said knife edge bearings, and a movable contact operated by said armature.

4. A relay for use on railway vehicles comprising, a rotary element, electro-responsive means for operating said element, a pivotally supported contact element having a contact spring, a stationary contact adapted to cooperate with said contact spring, and means for operatively connecting said rotary element to said contact element in a manner to afford a variable turning ratio between said element, said last mentioned means being constructed to compensate for variations in the tension of said spring due to engagement of its contact with said stationary contact.

5. A relay for train control systems adapted to be mounted on railway vehicles, having an element balanced about a center, said element being counterbalanced by another element also balanced about a center and moving oppositely thereto.

6. A relay having two counterpart armatures positively mechanically coupled together to move in opposite directions by counter-balanced parts including a pivotally supported element mounted to turn about an axis, each of said armatures having such moments of inertia that the moments of one counter-balance the moments of the other due to any form of vibratory disturbance.

7. A relay having two substantially parallel armatures pivotally supported and of the same moment of inertia, said armatures being mechanically connected to move in opposite directions on their pivotal axes by a counter-balanced mechanical connection including a member pivotally mounted to turn about a fixed central axis.

8. A relay for train control systems comprising a biased movable contact, and two armatures counterbalancing each other operatively connected to the contact by counter-balanced parts including members mounted to turn about central axes.

9. A relay for use in connection with vehicle carried apparatus of train control systems comprising, two movably mounted armatures, pivotally mounted and rotatably counter-balanced means mechanically connected to both of said armatures and a spring on said pivotally mounted means for biasing said mechanism to a predetermined position.

10. A relay comprising, a pair of biased armatures balanced against each other, a pivotally mounted contact spring, and means including a pivotally mounted lever of variable effective length for varying the effective force transmitted by said armatures to said contact.

11. Means for operating a pivotally mounted contact spring by a spindle comprising, a pivoted driving lever arm and a pivoted driven lever arm, one of which has a variable effective length, the variable effective length automatically changing to compensate for the variable pressure of said contact spring.

12. A relay comprising, a core, an armature associated with said core, contact means biased in normal position, and mechanism including a pivotally mounted and axially balanced element counter-balanced for all positions thereof connecting the armature with said means and varying the force transmitted from the armature to said means to produce a substantially uniform torque by said means.

13. A relay comprising, a core, knife edge bearings adjacent to one end of the core, armatures having indentations resting against said bearings and members for holding said armatures against said bearings, and for operatively connecting said armatures to move oppositely to balance the same against each other.

14. A relay comprising oppositely positioned knife edge bearings, armatures resting against said bearings, and resilient means operatively connecting said armatures and holding them against said bearings.

15. A relay having two armatures pivotally supported on opposing knife edge bearings, and two members connecting said armatures and transmitting thrusts from one armature to the other tending to turn them in opposite directions.

16. A relay having two armatures pivotally supported on opposing knife edge bearings, members having knife edges engaging said armatures to move them in opposite directions.

17. A relay for use on railway vehicles comprising, a rotary element, electro-responsive means for operating said element, a pivotally supported contact element having a contact spring, an adjustable stationary contact adapted to cooperate with said contact spring, and means for operatively connecting said rotary element to said contact element in a manner to afford a variable turning ratio between said elements, said last mentioned means being constructed to compensate for variations in the tension of said spring due to engagement of its contact with said stationary contact.

18. A relay of the tractive armature type comprising, a core, a winding on said core, an armature, a stationary contact, a movable spring contact, and means for operating said spring contact by said armature so that substantially a constant surplus operating force exists for moving said contact spring for the various positions during which the stationary and movable contact cooperate including, means for compensating for variations in the tractive force between said armature and core, and compensating means to take care of the additional pressure to be overcome as the tension of the contact spring changes.

19. A relay of the tractive armature type comprising, a core, a winding on said core, an armature limited in its movement to and from said core, a stationary contact, a movable spring contact, and means for operating said spring contact by said armature so that substantially a constant surplus operating force exists for the various positions during which the stationary and movable contact cooperate including, means for compensating for variations in the tractive force between said armature and core, and compensating means to take care of the additional pressure to be overcome as the tension of the contact spring changes.

In testimony whereof I hereto affix my signature.

RICHARD C. LEAKE.